(12) United States Patent
Kamenetsky et al.

(10) Patent No.: US 7,990,954 B2
(45) Date of Patent: *Aug. 2, 2011

(54) METHOD AND APPARATUS FOR CONTROLLING TELEPHONE CALLS USING A COMPUTER ASSISTANT

(75) Inventors: Mark L. Kamenetsky, Truckee, CA (US); Lois M. Okino, Sunnyvale, CA (US)

(73) Assignee: Converged Data Solutions, Inc., Marshall, TX (US)

( * ) Notice: Subject to any disclaimer, the term of this patent is extended or adjusted under 35 U.S.C. 154(b) by 172 days.

This patent is subject to a terminal disclaimer.

(21) Appl. No.: 12/290,637

(22) Filed: Nov. 1, 2008

(65) Prior Publication Data

US 2009/0185556 A1    Jul. 23, 2009

Related U.S. Application Data (63) Continuation of application No. 11/803,567, filed on May 14, 2007, now Pat. No. 7,450,573, which is a continuation of application No. 10/188,260, filed on Jul. 1, 2002, now Pat. No. 7,218,629.

(51) Int. Cl.
*H04L 12/66* (2006.01)

(52) U.S. Cl. ......... 370/352; 370/493

(58) Field of Classification Search .......... None
See application file for complete search history.

(56) References Cited

U.S. PATENT DOCUMENTS

| | | | | |
|---|---|---|---|---|
| 6,339,644 B1 | | 1/2002 | O'Neil et al. | 379/90.01 |
| 6,504,910 B1 | | 1/2003 | Engelke et al. | 379/52 |
| 6,721,416 B1 | * | 4/2004 | Farrell | 379/265.07 |
| 6,829,236 B1 | | 12/2004 | Archer | 370/353 |
| 6,879,678 B1 | * | 4/2005 | Lang | 379/219 |
| 6,888,927 B1 | * | 5/2005 | Cruickshank et al. | 379/88.11 |
| 6,963,556 B1 | | 11/2005 | Goldman | 370/352 |
| 7,035,623 B2 | * | 4/2006 | Pappalardo et al. | 455/412.1 |
| 7,164,689 B2 | | 1/2007 | Ito | 370/242 |
| 7,218,629 B2 | | 5/2007 | Kamenetsky | 370/352 |
| 7,289,493 B1 | * | 10/2007 | Vera | 370/356 |
| 7,411,939 B1 | * | 8/2008 | Lamb et al. | 370/352 |
| 7,450,573 B2 | * | 11/2008 | Kamenetsky et al. | 370/352 |
| 7,742,587 B2 | * | 6/2010 | Cohen | 379/202.01 |
| 2002/0069060 A1 | * | 6/2002 | Cannavo et al. | 704/257 |
| 2003/0014488 A1 | * | 1/2003 | Dalal et al. | 709/204 |
| 2003/0058805 A1 | | 3/2003 | Meyerson et al. | 370/260 |
| 2003/0091027 A1 | | 5/2003 | Celi et al. | 370/352 |
| 2003/0095542 A1 | | 5/2003 | Chang et al. | 370/352 |
| 2003/0169868 A1 | * | 9/2003 | Lambrigts et al. | 379/230 |
| 2003/0185374 A1 | | 10/2003 | Baker | 379/220.01 |
| 2004/0037266 A1 | | 2/2004 | Roberts et al. | 370/352 |
| 2004/0162051 A1 | | 8/2004 | Elsey et al. | 455/403 |

* cited by examiner

*Primary Examiner* — Phirin Sam
(74) *Attorney, Agent, or Firm* — Loudermilk & Associates (57) ABSTRACT

Systems and methods for monitoring, making, managing and controlling telephone communications with a computer call assistant with an integrated voice/data communications system are disclosed. A call assistant computer application preferably runs on a personal computer ("PC") coupled to the integrated system over a packet bus. The call assistant exchanges control and/or status packets with the integrated system preferably over a packet bus. The call assistant enables the user to make, receive and control telephone calls, monitor the status of the user's extension, voice mail, etc., and preferably operates with integrated systems capable of transmitting and receiving voice and data in multiple modes. In preferred embodiments, the computer call assistant operates with systems that are capable of multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router.

20 Claims, 8 Drawing Sheets

| Icon | Call State | Description | Tooltip | Left Mouse Button Hit Default Action |
|---|---|---|---|---|
| | Unavailable | This icon also appears when the monitored extension is "closed". | Phone is not available | Nothing happens |
| | Idle | This icon indicates that the extension is idle. | Click to dial the highlighted number | Goes to the current open window on the desktop that has the focus, and makes a call to the highlighted text in that window (the assumption is made that the highlighted number is a number to call).<br><br>If "Confirm Make Call" is selected in the Confirmation Configuration Dialog, a confirmation window will appear before the call is placed. |
| | Dialing | This icon indicates that the extension is offhook, dialing, or hearing ringback (i.e. setting up a call). | Click to drop the active call | Drops the call.<br><br>If "Confirm Drop Call" is selected in the Confirmation Configuration Dialog, a confirmation window will appear before the call is dropped. |
| | Ringing | This icon indicates that an incoming call is ringing the extension.<br><br>The icon "flashes" by alternating between the four images. | Click to answer the incoming call | Answers the call.<br><br>If "Confirm Answer Call" is selected in the Confirmation Configuration Dialog, a confirmation window will appear before the call is answered. |
| | Connected | This icon indicates that the extension is connected to a call. | Click to drop the active call | Drops the call.<br><br>If "Confirm Drop Call" is selected in the Confirmation Configuration Dialog, a confirmation window will appear before the call is dropped. |
| | Holding | This icon indicates that the extension has a call on hold. | Click to reconnect held call | Reconnects the call.<br><br>If "Confirm Reconnect Call" is selected in the Confirmation Configuration Dialog, a confirmation window will appear before the call is reconnected. |

FIG. 3/1

| Icon | Call State | Description | Tooltip | Left Mouse Button Hit Default Action |
|---|---|---|---|---|
| ■ | Disconnected | This icon indicates that the extension is disconnected from a call. May be transitory as the system may terminate the disconnected state and play the extension on-hook. | Click to drop the active call | Drops the call. If "Confirm Drop Call" is selected in the Confirmation Configuration Dialog, a confirmation window will appear before the call is dropped. |
| ☎ ☎ | Busy | This icon indicates that the extension is busy. The icon "flashes" by alternating between the two images. | Click to drop the active call | Same as disconnected state |
| ☎ | Forwarded | This icon indicates that the extension is forwarded (i.e. all calls to the extension will be forwarded). This icon only appears when the extension is idle and the extension is forwarded. | Click to dial the highlighted number | Same as idle state. |
| ☎ | DND | This icon indicates that the extension is in do not disturb mode. This icon only appears when the extension is idle and the extension is in do not disturb. | Click to dial the highlighted number | Same as idle state. |

FIG. 3/2

| Icon | Call State | Description | Tooltip | Left Mouse Button Hit Default Action |
|---|---|---|---|---|
| ▨ ▨ | Message Waiting | This icon indicates that there is a Voice Mail message waiting for the device.<br><br>The icon "flashes" by alternating between the two images. | Click to call Voice Mail | Calls the Voice Mail extension configured in the Voice Mail Configuration Dialog and logs on to Voice Mail using the password configured in the Voice Mail Configuration Dialog. |

| Main Menu Item | Description |
|---|---|
| Make Call | Makes a call using the highlighted text in the last desktop window that had the focus. A Confirm Call Dialog appears before making the call. |
| Answer Call | Answers the call that is ringing the extension. |
| Drop Call | Drops the current call. |
| Hold Call | Holds the current call. |
| Reconnect Held Call | Reconnects a held call. If more than 1 call is on hold a Reconnect Call Dialog will appear before the call is reconnected. |
| Transfer... | Brings up the Transfer Dialog enabling user input of the name of number of the transferee party. |
| Complete Transfer | Completes the screened transfer. |
| Conference... | If there is a connected call and no held call, brings up the Conference Dialog to enable one or more parties to be added to the conference.<br><br>If there is connected call and a held call, adds the call that is not in the conference to the conference. If no conference exists, one is created. |
| Call Voice Mail | Calls the Voice Mail extension configured in the Voice Mail Configuration Dialog and logs on to Voice Mail using the password configured in the Voice Mail Configuration Dialog. |
| User Speed Dials | A submenu appears that allows the user to make calls using the speed dials configured in the User Speed Dials Configuration Dialog. The submenu includes names and/or numbers of particular parties (typically frequently called parties). |
| Forward... | Toggles forwarding on and off.<br><br>When forwarding is turned on, a check appears next to this menu item.<br><br>When forwarding is turned off and this menu item is selected a Forward All Calls Dialog appears.<br><br>The Forward and Do Not Disturb menu items are mutually exclusive. For example, if forwarding is on and the user selects Do Not Disturb, forwarding will be turned off and the extension will be placed in do not disturb mode. |
| Do Not Disturb | Toggles do not disturb on and off.<br><br>When do not disturb is turned on, a check appears next to this menu item.<br><br>When selected, the do not disturb command is sent to the server. The menu item will not update until the server confirms the do not disturb on/off. |
| Call Status | The submenus allow the user to manipulate the Call Status Dialog and selectively control when and how a call status popup menu will be displayed. |
| Configure | The submenus allow the user to do configuration for the application. |
| About Call Assistant... | Displays the About Dialog for the application. |
| Exit Application | Terminates the application. |

METHOD AND APPARATUS FOR CONTROLLING TELEPHONE CALLS USING A COMPUTER ASSISTANT

This application is a continuation of application Ser. No. 11/803,567, filed May 14, 2007, now U.S. Pat. No. 7,450,573, which is a continuation of application Ser. No. 10/188,260, filed Jul. 1, 2002, now U.S. Pat. No. 7,218,629.

FIELD OF THE INVENTION

The present invention relates to systems and methods for making telephone calls using a computer call assistant, and more particularly to systems and methods for monitoring, making, managing and controlling telephone communications using a computer call assistant with integrated systems capable of transmitting and receiving voice and data in multiple modes, and more particularly with systems capable of multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router.

BACKGROUND OF THE INVENTION

Various integrated voice/data communications systems have been proposed. Exemplary systems of this type are disclosed in the following U.S. Patents, all of which were originally assigned to the assignee of the present invention: U.S. application Ser. No. 09/055,072, filed on Apr. 3, 1998, for Systems and Methods for Multiple Mode Voice and Data Communications Using Intelligently Bridged TDM and Packet Buses; U.S. application Ser. No. 09/055,036, filed on Apr. 3, 1998, for System and Method for Generating Voltages in Telephony Station Cards; U.S. application Ser. No. 09/161,550, filed on Sep. 25, 1998, for Systems and Methods for Multiple Mode Voice and Data Communications Using Intelligently Bridged TDM and Packet Buses and Methods for Performing Telephony and Data Functions Using the Same; U.S. application Ser. No. 09/163,596, filed on Sep. 29, 1998, for Systems and Methods for Multiple Mode Voice and Data Communications Using Intelligently Bridged TDM and Packet Buses and Methods for Performing Telephony and Data Functions Using the Same; U.S. application Ser. No. 09/167,408, filed on Oct. 6, 1998, for Systems and Methods for Multiple Mode Voice and Data Communications Using Intelligently Bridged TDM and Packet Buses and Methods for Performing Telephony and Data Functions Using the Same; U.S. application Ser. No. 09/283,101, filed on Mar. 31, 1999 for Systems and Methods For Multiple Mode Voice and Data Communications Using Intelligently Bridged TDM and Packet Buses and Methods For Performing Telephony And Data Functions Using the Same; and U.S. application Ser. No. 09/368,460, filed on Aug. 4, 1999 for Systems and Methods For Multiple Mode Voice and Data Communications Using Intelligently Bridged TDM and Packet Buses and Methods For Implementing Language Capabilities Using the Same (the "Referenced Patent Documents"). The Referenced Patent Documents are hereby incorporated by reference in their entirety. Such integrated systems are known to provide various advanced and desirable voice and data communications services and functions, including management and control of telephone calls and the like.

In today's business and personal environment, many users of such systems generate, receive and/or display content from a wide variety of data sources on their computers. For example, a researcher may simultaneously, or within a very short amount of time, be viewing content from the Internet, from local or remote data bases, from emails, from locally or remotely stored computer files, from other computer or storage devices connected via a local area or wide area network, etc. In many instances, it is desirable for a user to be making, managing or controlling telephone calls while also engaged in viewing such content on a computer. It also is common for a user to desire to make telephone calls related to the viewed content, which may be a regular or frequent basis.

While integrated voice/data communications systems such as described above provide various desirable telephone communications services and functions, improved systems and methods for making, managing and controlling telephone calls are desired, particularly for users of such integrated voice/data communications systems.

SUMMARY OF THE INVENTION

The present invention provides systems and methods for monitoring, making, managing and controlling telephone communications with a computer call assistant, preferably with integrated systems capable of transmitting and receiving voice and data in multiple modes. In preferred embodiments, the computer call assistant operates with systems that are capable of multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router.

In preferred embodiments, call assistant is a computer application that runs on a personal computer ("PC") coupled to the integrated system over a packet bus (e.g., an Ethernet local area network). In preferred embodiments, the PC runs on a Windows® (Windows is believed to be a registered trademark of Microsoft Corp.). The call assistant exchanges control and/or status packets with the integrated system preferably over a packet bus. The call assistant enables the user to make, receive and control telephone calls, monitor the status of the user's extension, voice mail, etc.

Accordingly, it is an object of the present invention to provide systems and methods for monitoring, making, managing and controlling telephone communications with a computer call assistant.

It is another object of the present invention to provided such a computer call assistant that operates with integrated systems capable of transmitting and receiving voice and data in multiple modes.

It is yet another object of the present invention to provide such a computer call assistant with an integrated system that enables native mode voice communications, such that exist in a native PCM, circuit switched and/or TDM mode, over a TDM bus while concurrently enabling packet-based communications to be, for example, protocol processed and communicated over the TDM bus, such as is described in greater detail in the Referenced Patent Documents.

BRIEF DESCRIPTION OF THE DRAWINGS

The above objects and other advantages of the present invention will become more apparent by describing in detail the preferred embodiments of the present invention with reference to the attached drawings in which:

FIG. 6 is a table illustrating exemplary main menu items and description in a preferred embodiment of the present invention;

DETAILED DESCRIPTION OF THE PREFERRED EMBODIMENTS

The present invention will be described in greater detail with reference to certain preferred and certain other embodiments, which may serve to further the understanding of preferred embodiments of the present invention. As described elsewhere herein, various refinements and substitutions of the various elements of the various embodiments are possible based on the principles and teachings herein.

As previously indicated, the present invention provides a computer call assistant that facilitates monitoring, making, managing and controlling telephone communications with a computer call assistant. The call assistant of the present invention has been determined to be particularly useful with integrated systems capable of transmitting and receiving voice and data in multiple modes. In preferred embodiments, the call assistant operates with systems that are capable of multiple native mode voice and data transmissions and receptions with a communications system having a multi-bus structure, including, for example, a time division multiplexed ("TDM") bus, a packet bus, and a control bus, and multi-protocol framing engines, preferably including subsystem functions such as PBX, voice mail, file server, web server, communications server, telephony server, LAN hub and data router. Preferred integrated systems are described in detail in the Referenced Patent Documents.

Figure 1:
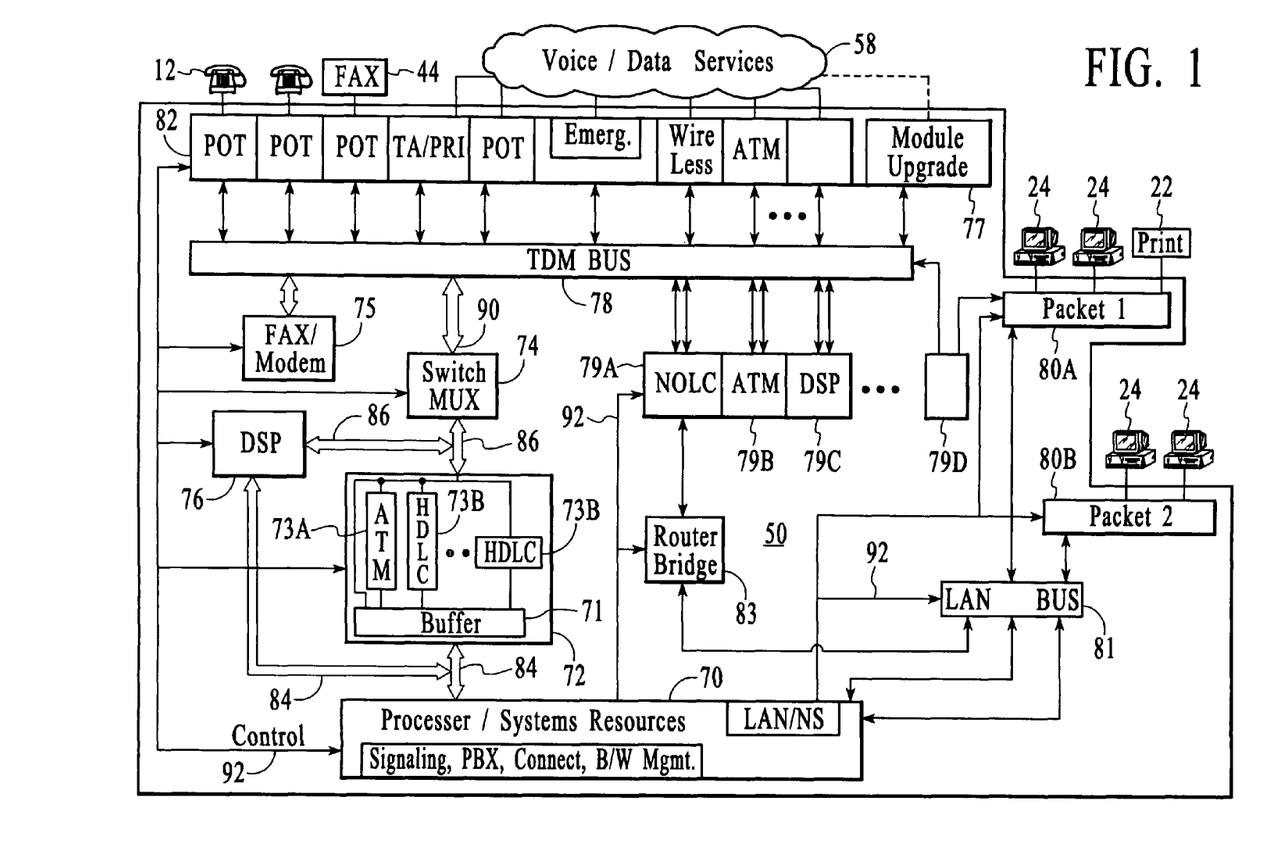
FIG. 1 is a block diagram from the Referenced Patent Documents that illustrates exemplary preferred embodiments of an integrated system utilized in preferred embodiments of the present invention.

FIG. 1 is a reproduction of a "FIG. 3" taken from the Reference Patent Documents. FIG. 1 of this application is described in detail in the Referenced Patent Documents (such description is expressly incorporated herein by reference), which will not be repeated here. What is important is that FIG. 1 illustrates an integrated system (communication system 50) coupled to a plurality of user telephones 12 and user PCs 24 (user PCs 24 provide the preferred PC system on which the preferred call assistant application is run in accordance with preferred embodiments of the present invention). Communication system 50 has a multi-bus structure, including one or more TDM buses 78 and one or more packet buses 80A, 80B.

Native mode voice communications may occur, for example, via telephones 12 (which may be digital or analog or a combination thereof, but preferably are digital) over TDM bus 78 and a WAN (e.g., POTs lines, T-1, PRI, etc. Data communications may be selectively bridged (preferably with multiple communication paths) from one of the packet buses (which could include packetized VoIP voice communications) to TDM bus 78, which may then couple such communications to a WAN concurrently with such native mode voice communications, etc. One exemplary WAN is a T-1, PRI (whole or fractional), ISDN, Frame relay or similar WAN interface, particularly, for example a connection such as a T-1 in which certain channels are dedicated to voice communications and certain channels are dedicated to data communications, etc. Communication system 50 also includes processor/system resources 70, which in an exemplary preferred embodiments is a Windows-based computing system, which is capable of communicating with PCs 24 over a variety of connections, including via packet buses 80A and 80B. Such details of the construction and operation of communication system 50 are described in greater detail in the Referenced Patent Documents.

In preferred embodiments, the caller assistant application is a Microsoft Windows application that will allow the user to place outgoing calls and be notified about incoming calls. In preferred embodiments, if there is only one telephone/interactive voice device associated with the PC and one extension on that device, the caller assistant application will automatically use that device and extension. If there is more than one telephone/interactive voice device associated with the PC or more than one extension on a device, the caller assistant application preferably displays a device configuration dialog box the first time the time that the application is invoked, which allows the user to select which device and extension are to "handle" the calls. With the preferred caller assistant application being a Microsoft Windows application, standard Windows operations and conventions are known to those of skill in the art and in general will not be described in great detail herein. For example, users can highlight an item in a control list/menu, and users can scroll up and down in a list box using the scroll bars or using the up and down arrow keys, etc.

Figure 2:
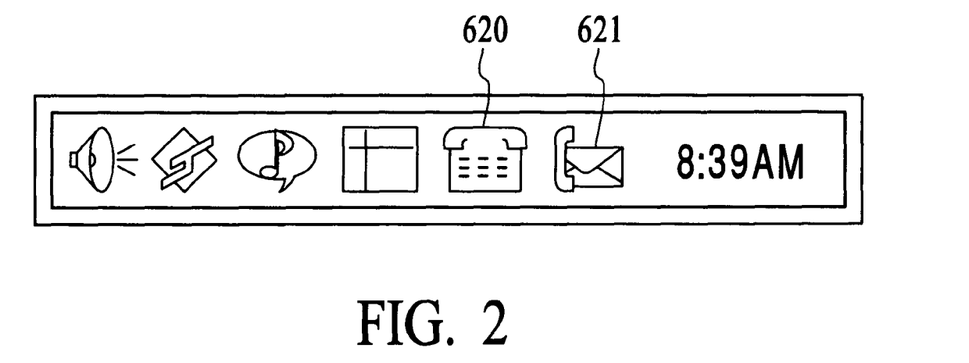
FIG. 2 is an exemplary system tray icon configuration used in a preferred embodiment of the present invention.

Also in preferred embodiments, the caller assistant application is designed to take up minimal desktop real estate on the user's PC. When it is running, one or more system tray icons preferably will appear in a small window typically positioned near the bottom or top of the display (as system tray-type icons are well known in the art, they will not be further discussed here; what is important is that the call assistant application preferably have a small visible presence on the display, which does not materially interfere with other applications that the particular user desires to run, etc.). Preferably, there are two system tray icons that may appear when the call assistant application runs, the main icon and the message waiting icon. In preferred embodiments, the main icon appears in the system tray at all times when the application is running, which provides a visual indication that the call assistant application is available to assist the user, etc. Exemplary icons are illustrated in FIG. 2, with the main icon illustrated as 620, and the message waiting icon illustrated as 621. Other icons that may be included in the system tray, as will be appreciated by those of skill in the art, are illustrated in FIG. 2 but not further discussed herein.

Herein, and generally in the art, placing the cursor (typically controlled with a mouse or other pointer, etc.) over an icon may result in the presence of a small window including information or images, which are referred to as "tooltips." In preferred embodiments, when the cursor is held over the main icon for a period of time, a tooltip will pop up. The tooltip text preferably depends on the state of the call assistant application. There preferably is a default action that happens when the user clicks the left mouse button on the icon. The default action depends on the state of the call assistant application. There preferably is a menu associated with the icon when the user clicks the right mouse button on the icon.

Figure 3:
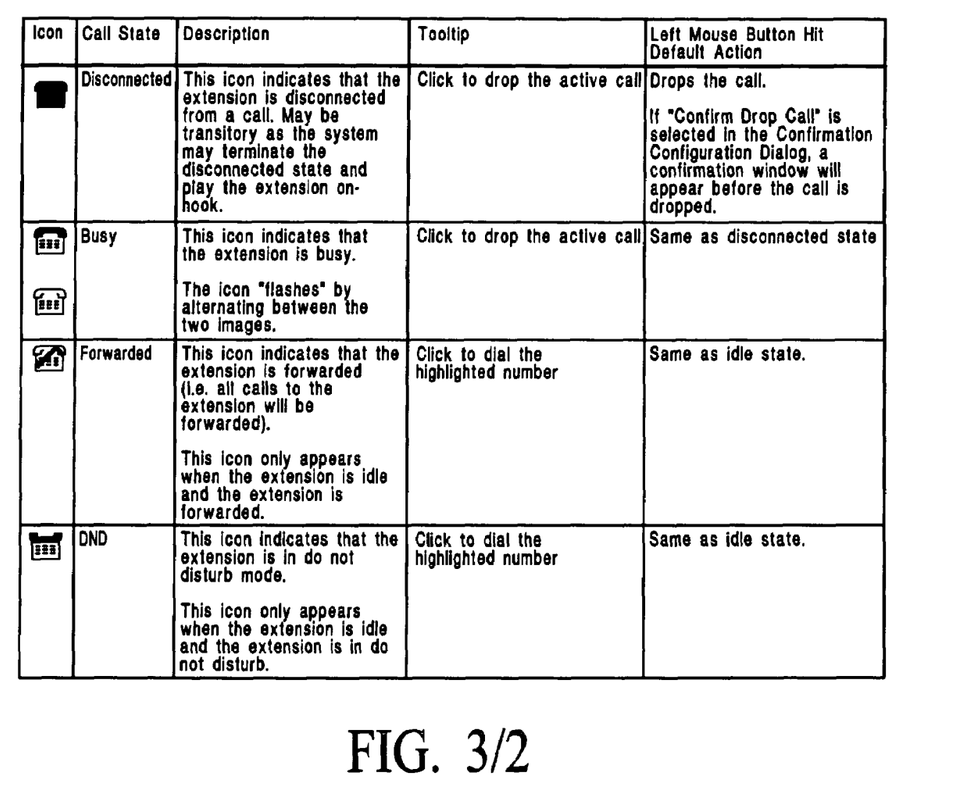
FIG. 3 is a table illustrating exemplary main icons, call states, descriptions, tooltips and left mouse button hit default actions in a preferred embodiment of the present invention.

In preferred embodiments, the main system tray icon for the call assistant application preferably will show the states shown in FIG. 3. As the exemplary icon, associated call state, description, tooltip and left mouse button hit default action are provided in FIG. 3 in a descriptive manner, generally such icons, states, action, etc., will not be described in great detail. Among the important points to note, however, include the following.

A plurality of icons, animated icons, etc. are provided, with the particular icon displayed depending upon the call state and what actions will be associated with a left mouse click on the icon. The particular icon is selected based on information sent from communication system 50, preferably via control or status packets exchanged over packet bus 80A or 80B, etc. Preferably, upon initial running of call assistant application, control and/or status packets are exchanged with communication system 50 so that communication system 50 registers that the call assistant application is "registered" as running for a particular user. Preferably configuration information is exchanged via such packets such that communication system 50 knows that it should periodically, or upon change in status of the particular user's telephone or extension, updated control and/or status packets are exchanged so that the displayed icons can be updated by the call assistant application consistent with the then-current status of the user's telephone, extension, voice mail, etc. As it is desirable for communication system 50 to attempt to send such control and/or status packets to user's computers that have "registered" as running the call assistant application, communication system 50 preferably keeps a registration of which users are running the call assistant application so that updated control and/or status packets are selectively sent via a packet bus only with respect to the particular user whose telephone, extension and/or voice mail has changed status. In preferred embodiments, the communication system 50 reports the then-current status of the particular user's telephone in response to registration of the user having launched the call assistant application, and thereafter reports any change of status as previously described. Also in preferred embodiments, as a "watch dog" type of action, preferably the user's PC periodically queries communication system 50 for the status of the user's telephone, extension and/or voice mail so that the call assistant application can confirm that it has recorded the correct current status, and is displaying the correct icon for that status, etc.

Similarly, as the user initiates actions, such as dialing or answering calls, etc. (as may be more fully understood from the figures and other description herein), the call assistant application causes control and/or status packets to be sent from the user's PC to communication system 50 so that communication system 50 can take the appropriate action (e.g., answer the call, dial the call, connect to voice mail box, etc.). Based on the description herein and in the Referenced Patent Documents, such exchange of control and/or status packets to carry out the actions contemplated herein will be understood to one of skill in the art.

Figure 4:
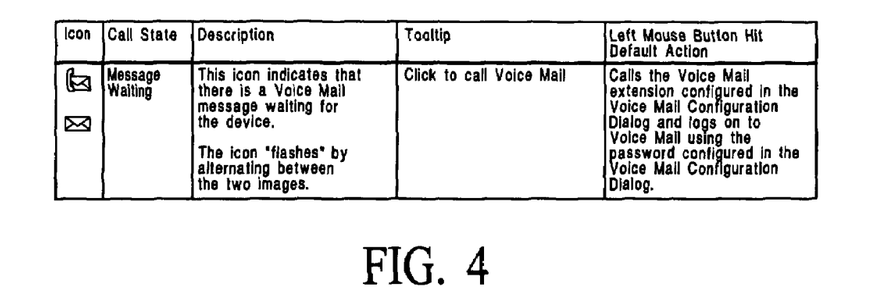
FIG. 4 is a table illustrating exemplary message waiting icons, icon state, description, tooltip and left mouse button default action in a preferred embodiment of the present invention.

In preferred embodiments, when there is a voice mail message waiting for the user's extension or primary extension, a second icon will appear in the system tray to the right of the main icon. When the cursor is held over the icon for a period of time, a tooltip will pop up. Preferably, there is a default action that happens when the user clicks the left mouse button on the icon. Also preferably, there is no menu associated with this icon when the user clicks the right mouse button on the icon. The user must right click on the main icon for the menu. Exemplary message waiting icons, status, descriptions, tooltip and left mouse button default action are illustrated in FIG. 4.

Figure 5:
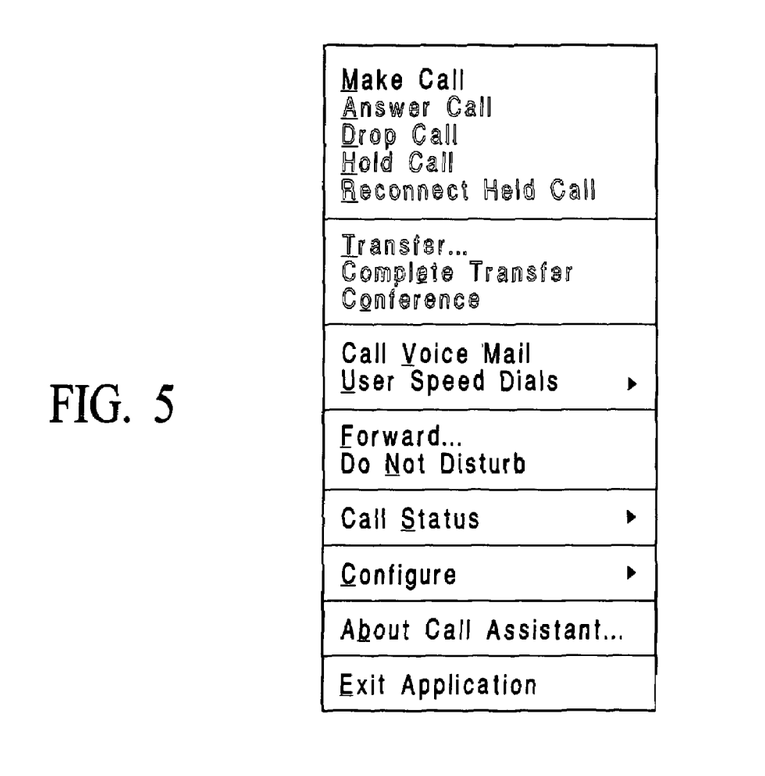
FIG. 5 is an exemplary main menu utilized in a preferred embodiment of the present invention.

In preferred embodiments, when the user right clicks on the main system tray icon for the call assistant application, a main menu will be displayed. The main menu preferably displays a variety of actions that may be initiated with the call assistant application in order to facilitate user or control of the user's telephone, extension and/or voice mail. An exemplary main menu is illustrated in FIG. 5, and exemplary actions associated with such a main menu are illustrated in FIG. 6. It should be understood that the illustrated main menu is exemplary only, as is the associated description of action. It also should be noted that FIG. 6 references various dialog boxes that may be displayed based on particular selections from the main menu. It will be appreciated by those of skill in the art that a variety of dialog boxes may be displayed to carry out the associated/described action, and further details of such dialog boxes are not provided herein. What is important is that the call assistant application provide, preferably with a simple mouse click, etc., a menu of actions that may be readily selected by the user in order to facilitate the use and/or control of the user's telephone, extension and/or voice mail, etc.

In preferred embodiments, when the user right clicks on the main system tray icon for the call assistant application, a main menu will be displayed. The main menu preferably displays a variety of actions that may be initiated with the call assistant application in order to facilitate user or control of the user's telephone, extension and/or voice mail. An exemplary main menu is illustrated in FIG. 5, and exemplary actions associated with such a main menu are illustrated in FIG. 6. It should be understood that the illustrated main menu is exemplary only, as is the associated description of action. It also should be noted that FIG. 6 references various dialog boxes that may be displayed based on particular selections from the main menu. It will be appreciated by those of skill in the art that a variety of dialog boxes may be displayed to carry out the associated/described action, and further details of such dialog boxes are not provided herein. What is important is that the call assistant application provide, preferably with a simple mouse click, etc., a menu of actions that may be readily selected by the user in order to facilitate the use and/or control of the user's telephone, extension and/or voice mail, etc.

When the main menu is available, the following menu items preferably are always available: configure and all of its submenu items; about call assistant; and exit application. When the main menu is available AND the line is open, the following additional menu items preferably are always available: call voice mail; forward; do not disturb; and call status submenu items. When the monitored extension (user telephone extension or primary extension) is closed, the following main menu items will be grayed/disabled and there is no default menu item: make call; answer call; drop call; hold call; reconnect held call; transfer; complete transfer; conference; call voice mail; user speed dials submenu items; forward; do not disturb; and call status submenu items. When the monitored extension is open, the following describes what additional menu items preferably are available based on the state of the call assistant application/extension: Idle (Make Call (default) and User Speed Dials); Dialing (Drop Call (default)); Ringing (Answer Call (default)); Connected (Drop Call (default) and Hold Call); Holding (Reconnect Call (default) and User Speed Dials); Disconnected (Drop Call (default)); Busy (Drop Call (default)); Forwarded (Same as Idle state); and DND (Same as Idle state).

Based on the foregoing, it will be appreciated that a variety of call control, voice mail access, status, etc. dialog, configuration and activation menus may be readily displayed in order to facilitate the user in monitoring, making, managing and controlling telephone communications using a computer call assistant.

Figure 7:
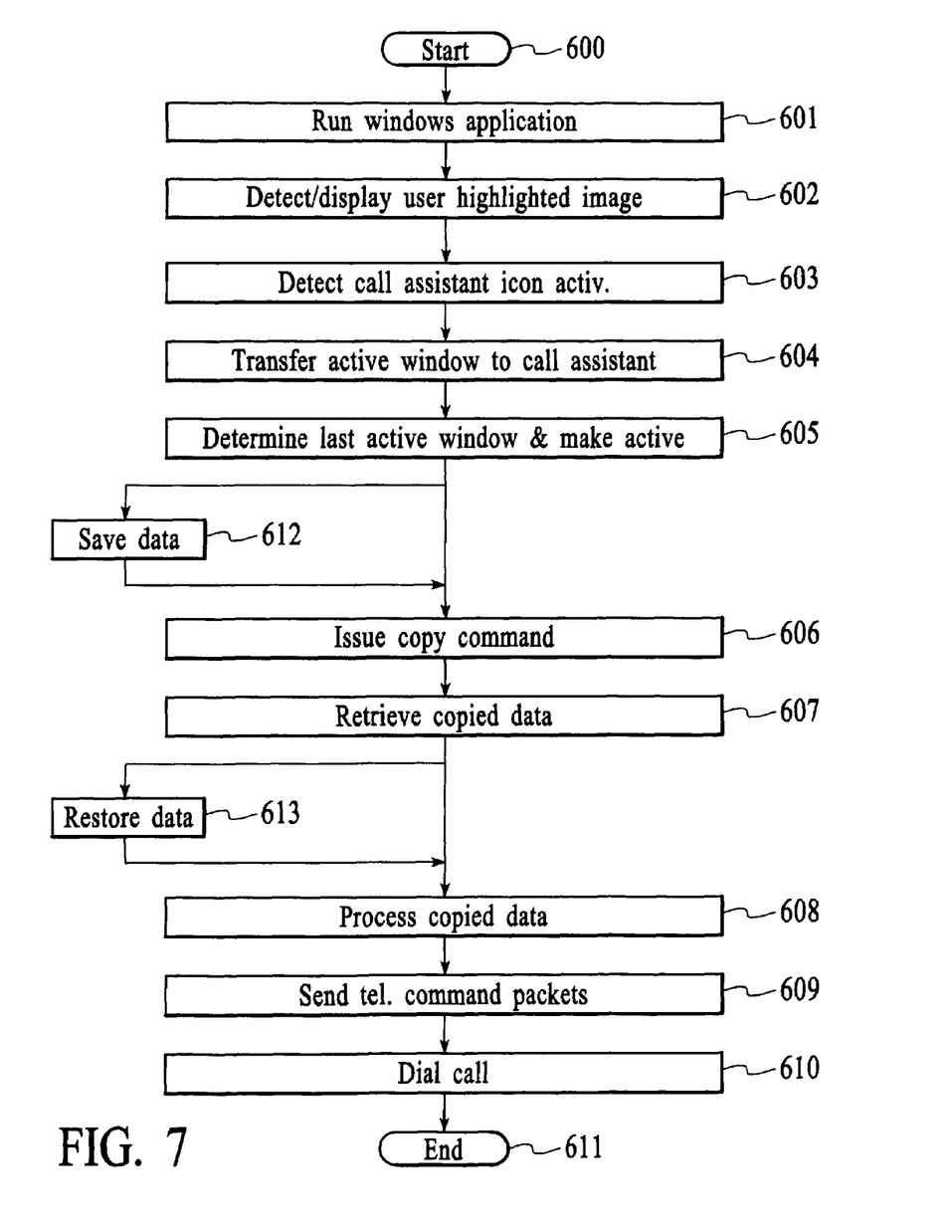
FIG. 7 is an exemplary call flow sequence for initiating a call with a call assistant in accordance with a preferred embodiment of the present invention.

FIG. 7 illustrates a preferred exemplary process flow in accordance with one preferred embodiment of the present invention. From start 600, the flow assumes that a PC is coupled to communications system 50, powered up and running various programs. As described in the Referenced Patent Documents, communications system 50 and the PC may undergo various administrative procedures, such as login, authentication, etc.; what is important is that communications systems 50 and the PC are operating in a coordinated manner, with command, data and/or voice being exchanged between the two systems, with the exemplary and preferred connection between the two being an Ethernet LAN connection.

At step 601, the user PC is running a Windows application from which various content is displayed on the PC. Exemplary applications include web browsers, data base search engines, word processors, email programs and the like. What is important is that the user is utilizing some software on the PC, with the software typically being an application program that displays various images, text, data, etc., on the display of the PC for viewing by the user. At step 602, the user highlights some portion of a displayed image that is detected typically by the operating system controlling the PC. This action typically is performed by the user highlighting displayed characters or data with a mouse click/movement operation, as is conventional.

At step 603, the user activates the call assistant icon, which is preferably what is known as a system tray icon. Preferably, the Windows operating system detects the call assistant icon activation, and program control/active window status is transferred to the call assistant application (step 604). At step 605, the call assistant application determines which window/application was last active prior to the call assistant application becoming the active window. This preferably is done through the call assistant application monitoring the active windows status through what is commonly referred to as "Windows hooks," which may be considered a Windows API query by which an application can ask that the Windows operating system report which application is the active window. While other techniques are within the spirit and scope of the present invention, in such preferred embodiments the call assistant application monitors the active window status and stores the current active window status (preferably in a software or virtual buffer), and upon being made the active window, the call assistant application retrieves information identifying the last active window, and makes this application the active window (step 605). It should be noted that, although the call assistant application was made the active application by the user activation of the call assistant icon, due to preferred operation of the call assistant application at steps 604 and 605, software control is returned to the previously active window/application quickly (i.e., after determination of which window/application was last active), and in preferred embodiments happens so quickly such that the fact that control was transferred from the application to the call assistant application. This momentary, and humanly imperceptible transfer of control from the active window/application to the call assistant application, is an important and desirable attribute in accordance with preferred embodiments of the present invention.

At step 606, with the previously active window/application made active once again at step 605, the call assistant application preferably issues a copy command, which in preferred Windows based embodiments is known as "control C" type command, which causes the user highlighted portion of the image (step 602), which typically will contain a collection of alpha-numeric characters/data including a telephone number, to be copied to the Windows "clipboard." While the present invention is not limited to the Windows-type environment, what is important is that the call assistant application has the ability to copy the user highlighted content from the active window/application to a resource that is accessible by the call assistant application for further processing. At step 607, the user highlighted content is retrieved by the call assistant application, which in preferred embodiments is accomplished by retrieving or copying of the clipboard contents to the call assistant application, where it is temporarily stored for further processing.

At step 608, the call assistant application processes the copied, user highlighted content in order to extract or generate a telephone number to be dialed. This may consist of a parsing of the highlighted content to identify a telephone number is included in the highlighted content, with an error dialog box preferably displayed if the call assistant application is not able to identify a telephone number. In certain embodiments, if the call assistant application determines that one or more possible strings exist in the highlighted content that may be a valid telephone number, preferably a dialog box is displayed that presents the user with the possible choices of telephone number, with the user able to select the desired telephone number with a mouse click, at which time the dialog box disappears. In the general case, the user will highlight content that includes a recognizable telephone number, which the call assistant application readily identifies. It should be noted that, at step 608, the call assistant application preferably determines if the telephone number is in the form of partial alpha characters (e.g., 1-800-flowers, etc.), and if so the call assistant application converts the alpha characters to appropriate digits (e.g., 1-800-356-9377). What is important is that the call assistant application extracts/determines a telephone number from the user highlighted content.

In addition, the call assistant application preferably has access, either locally or within resources stored within communication system 50, that identifies the local area code for communication system 50, any leading digits or the like required to place a call based on the extracted/determined telephone number. For example, the call assistant application, for a local call, will either not generate or delete the area code. For long distance calls, the call assistant application will add a leading 1 or other appropriate prefix. What is important is that the call assistant program contains sufficient intelligence to determine what sequence of digits are required in order to place a call via communication system 50 based on the telephone number extracted/determined from the user highlighted content.

At step 609, the call assistant application issues one or more commands from the PC to communication system 50 that direct the placing of the desired call on the telephone associated with the particular user. As described in the Referenced Patent Documents in greater detail, a typical user has a PC and a telephone assigned to that user. Typically, the environment is an office type environment with a plurality of users, each having a telephone and a PC. In preferred embodiments, the call assistant application issues the one or more commands (typically Ethernet packet(s)) from the user PC to communication system 50, and in response thereto communication system 50 takes the following preferred sequence of actions: take the user telephone off-hook, preferably in a hands-free or speakerphone mode of operation; based on an access of any routing tables or the like that may be applicable for the particular user (as described in greater detail in the Referenced Patent Documents, routing tables may specify particular call routing for a particular user, particular time of day, particular called party, etc.), determine the trunks, signaling, commands and the like required to place the call; and place the call (step 610). Upon answer by the dialed party, the user may then conduct a speakerphone type call, pick up the handset to talk, etc.

From a user perception standpoint, what is important is that the user highlights the content including the telephone number to be dialed, clicks the call assistant icon, and the call is dialed (and the call assistant dialing sequence ends as is illustrated by end step 611). The call assistant carries out the necessary processing to extract a valid telephone number from the highlighted content, and send commands to communication system 50 such that the call is dialed in an expeditious manner.

Also illustrated are steps 612 and 613, which are utilized in alternative preferred embodiments. In the Windows operating system environment, issuance of a copy command such as "control C" at step 606 may overwrite the contents of the temporary storage resource, which in Windows is the clipboard. While this is acceptable for most situations (as the user can be instructed of this behavior), in alternative embodiments the contents of the temporary storage resource/clipboard are preserved. At step 612, for example, the call assistant application issues a command to retrieve and copy the contents of the temporary storage resource/clipboard into a software or virtual buffer prior to issuance of the copy command at step 606. The flow continues as previously described through step 607, at which time step 613 is carried out. At step 613, the contents of the software or virtual buffer are restored to the temporary storage resource/clipboard. Thereafter, the flow continues as previously described.

Figure 8:
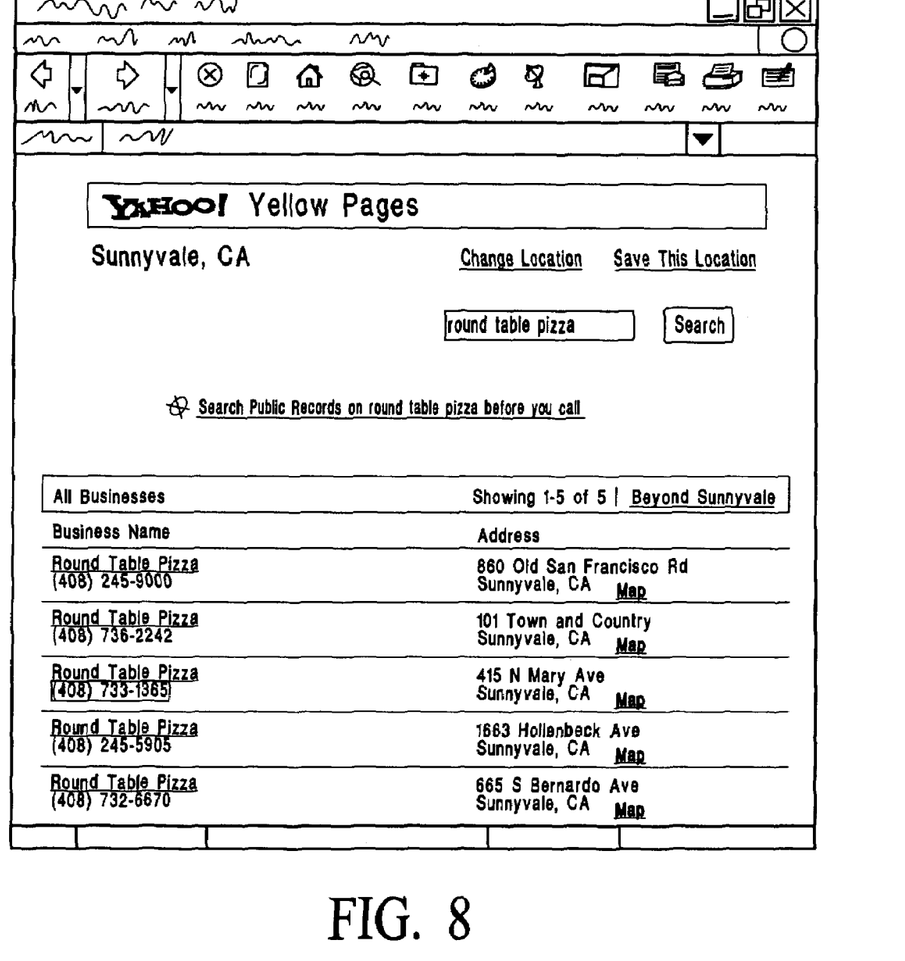
FIG. 8 is an exemplary screen shot of PC display illustrating an exemplary operation of a preferred embodiment of the present invention.

FIG. 8 illustrates an exemplary screen shot illustrating a web browser application displaying content including names and numbers of pizza vendors. A highlighted telephone is illustrated. With a click of the main system tray icon (shown in the lower right corner of FIG. 8), the call flow illustrated in FIG. 7 may be initiated, and the telephone number extracted from the highlighted content and dialed via commands from the user's PC sent via a packet bus to communication system 50, such as previously described.

What will be appreciated is that the call assistant of the present invention provides an expedient and highly desirable way of making, controlling, monitoring, etc. calls, extensions, voice mail, etc., particularly in the context of an integrated voice/data communication system such as communication system 50 described in the Referenced Patent Documents.

Refinements to the foregoing also are within the scope of the present invention. In one such alternative embodiment, a number is double clicked by the user, and a passage of the displayed contents are automatically highlighted (such as via line or paragraph highlighting), and via a simply right click the call assistant attempts to extract the telephone number, with one or more telephone numbers identified by the call assistant displayed in a call confirmation dialog box. In one embodiment, the call is dialed if a single number is identified (or a call assistant-highlighted number if there are more than one number identified) after a pre-determined period of time unless the user cancels the operation; in an alternative embodiment, the call is dialed only if the user confirms that the call action is to be taken, such as by further mouse click or hitting enter. In yet another embodiment, such a call sequence or call dialog box is initiated by a highlight and right click operation on the highlighted user content. What is important is that such alternatives, whereby other highlighting and dial initiation commands may be utilized, are also with the scope of the present invention.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method for initiating a voice communication using a call assistant program associated with a communications service providing voice communications, comprising the steps of:
    initiating execution of the call assistant program on a computing system;
    registering the call assistant program for a first user with the communications service, wherein status/control packets are periodically exchanged between the call assistant program and the communications service;
    displaying at least one icon on the computing system that presents status information regarding the first user;
    displaying content on the computing system with a program running on the computing system that is different from the call assistant program;
    parsing the displayed content with the call assistant program to determine a telephone number of a second user contained within the displayed content;
    in response to user activation, determining target information associated with a telephone of the second user;
    sending a voice communications initiation control packet from the call assistant program to the communications service; and
    initiating a voice communication via the communications service between the first user and the second user.

2. The method of claim 1, wherein the computing system comprises a personal computer.

3. The method of claim 1, wherein the telephone of the second user comprises a personal computer.

4. The method of claim 1, further comprising the steps of:
    determining a message waiting status by the call assistant program; and
    displaying a message waiting indicator on the computing system based on the message waiting status.

5. The method of claim 4, further comprising the step of:
    periodically querying the communications service by the call assistant program for a current status information associated with the message waiting status.

6. The method of claim 1, further comprising the step of:
periodically querying the communications service by the call assistant program for a current status information associated with the computing system.

7. The method of claim 6, further comprising the step of:
periodically querying the communications service by the call assistant program for a current status information associated with the telephone of the second user.

8. The method of claim 1, wherein the determining step further comprises detecting if user highlighted content contains alpha characters, wherein alpha characters contained are selectively converted to numerical digits.

9. The method of claim 1, wherein the communications service comprises a registration of which of a plurality of users are executing corresponding instances of the call assistant program on corresponding computing systems, and wherein a plurality of status/control packets are selectively periodically exchanged between the corresponding instances of the call assistant program and the communications service only with respect to particular users whose telephone, extension and/or voicemail has changed status.

10. A method for providing a voice communication using a first computing system associated with a first user, comprising the steps of:
providing a communications service managing voice communications between a plurality of users;
providing a voice communications software application executing on the first computing system;
registering the voice communications software application with the communications service, wherein status/control packets are periodically exchanged between the voice communications software application and the communications service;
displaying at least one icon on the first computing system that presents status information regarding a second user;
displaying content on the computing system with a program running on the computing system that is different from the call assistant program;
parsing the displayed content with the call assistant program to determine a telephone number of a second user contained within the displayed content;
in response to user activation, determining target information associated with a second computing system associated with the second user from the displayed content;
sending a voice communications initiation control packet from the voice communications software application to the communications service; and
facilitating a voice communication via the communications service between the first computing system and the second computing system.

11. The method of claim 10, wherein the first computing system comprises a personal computer.

12. The method of claim 10, wherein the second computing system comprises a personal computer.

13. The method of claim 10, further comprising the steps of:
determining a message waiting status by the voice communications software application; and
displaying a message waiting indicator on the first computing system based on the message waiting status.

14. The method of claim 13, further comprising the step of:
periodically querying the communications service by the voice communications software application for a current status information associated with the message waiting status.

15. The method of claim 10, further comprising the step of:
periodically querying the communications service by the voice communications software application for a current status information associated with the first computing system.

16. The method of claim 15, further comprising the step of:
periodically querying the communications service by the voice communications software application for a current status information associated with the second computing system.

17. The method of claim 10, wherein the determining step further comprises detecting if user selected content contains alpha characters, wherein alpha characters contained are selectively converted to numerical digits.

18. The method of claim 10, wherein the communications service comprises a registration of which users are executing corresponding instances of the voice communications software application on corresponding computing systems, and wherein a plurality of status/control packets are selectively periodically exchanged between the corresponding instances of the voice communications software application and the communications service only with respect to particular users for whom a user status has changed.

19. The method of claim 18, wherein the user status comprises message waiting status.

20. The method of claim 18, wherein the user status comprises a telephone status.

* * * * *